March 21, 1939.  A. A. ACKLEY ET AL  2,150,898

CONSTRUCTION OF BUILDINGS

Filed June 22, 1936  6 Sheets-Sheet 1

INVENTORS
ALLAN A. ACKLEY
CHARLES H. ANGELL

BY *Lee J. Gary*

ATTORNEY

March 21, 1939.  A. A. ACKLEY ET AL  2,150,898

CONSTRUCTION OF BUILDINGS

Filed June 22, 1936  6 Sheets-Sheet 4

INVENTORS
ALLAN A. ACKLEY
CHARLES H. ANGELL
BY Lee J Gary
ATTORNEY

March 21, 1939.  A. A. ACKLEY ET AL  2,150,898
CONSTRUCTION OF BUILDINGS
Filed June 22, 1936   6 Sheets-Sheet 6

INVENTORS
ALLAN A. ACKLEY
CHARLES H. ANGELL
BY *Lee J Gary*
ATTORNEY

Patented Mar. 21, 1939

2,150,898

UNITED STATES PATENT OFFICE 2,150,898

CONSTRUCTION OF BUILDINGS

Allan A. Ackley and Charles H. Angell, Mount Prospect, Ill.

Application June 22, 1936, Serial No. 86,602

24 Claims. (Cl. 72—1)

This invention is particularly concerned with improved methods, means and materials for the fabrication and erection of buildings. While particularly well adapted to dwellings the invention is applicable to practically any type of structure and particularly those in which insulation against heat and/or loss of heat is desirable. It also provides a type of structure which is virtually soundproof, exceptionally sturdy and possesses many other advantages from the viewpoint of economy in erection, maintenance and operation.

Good insulation is now generally accepted as a factor essential to comfort and heating economy in habitable structures. Its importance has been increased by the recent widespread and rapid adoption of air conditioning in both new and reconditioned buildings.

There are several well known and widely marketed types of insulating materials. They consist, in general, of the blanket or batt type, the fill type which may be either fibrous or granular, the plastic type, the reflective type and the rigid or sheet type. This invention is concerned primarily with the latter type and its applicability as a structural member in buildings in such a manner that, in addition to its function as an insulating material, it possesses other important utilities and combines, in a single member, the functions of several conventional members.

Heretofore all types of insulating materials have been considered an "extra" in the construction of dwellings, in the sense that they represent an expense over and above the cost of dwellings constructed in the conventional manner without insulation. The popular belief among those familiar with the building industry has been that about two inches of rigid or sheet insulating material represents the maximum which may be used and still keep its initial cost consistent with the savings in operation which result from its use. This belief is well founded insofar as its conventional use as insulating material is concerned. Of course, more can be used, but, taking as an example a conventional wall with studding, a single exterior course of brick veneer, wood sheathing between the brickwork and the studding and with lath and plaster as an interior finish; such a wall may have an overall heat transfer coefficient of approximately 0.170. One inch of insulating material having a conductivity of 0.340 will reduce the overall heat transfer coefficient of the wall to approximately 0.114. Two inches will reduce it to approximately 0.085 and three inches will further reduce it only to about 0.073 and so on. It is therefore apparent that the additional cost of thick sheets or slabs of insulation and the cost of installing them in the conventional manner soon becomes out of proportion to the saving in operating expenses resulting from the additional insulating properties which they provide.

The usual method of applying the rigid or sheet type of insulation in the outer walls of a dwelling or similar structure is to attach the sheets to the wall studs on either their inner or outer surface, or both, and the best conventional practice is to apply a portion of the insulating material on each side of the wall. The sheets of insulation are usually applied over the studding and beneath the finished surface of the wall except in some cheaper types of construction in which insulating board is used as the interior finish. However, plaster is still more widely used than any other type of interior finish. Although practically all insulating materials of the rigid or board type, have a good bonding surface for plaster, the use of furring strips and either metal or wood lath over the insulating sheets is recommended unless the insulation is one-half to three-fourths of an inch or more in thickness, when the wall studs to which the insulation is attached are spaced on close centers (usually 16 to 18 inches or less) and proportionately thicker when the supporting stud members are spaced farther apart. This is necessary to prevent flexing of the sheets and cracking or loosening of the plaster as well as permanent deformation or failure of the wall due to the weight of the plaster.

In conventional practice external finishes, whether wood siding, brick veneer, stone veneer or stucco, are never applied directly to thin sheets of insulating material regardless of stud spacing. Even when two inches or more of board type insulation is employed in the wall it is, as previously mentioned, usually applied, in part, adjacent the interior and, in part, adjacent the exterior surface of the wall and ordinarily, the structural strength of the external sheets is not sufficient to support any conventional external finish without excessive flexing and deformation or failure, regardless of the spacing between stud members. For stucco finishes furring strips and lath (either wood or metal and preferably the latter) are recommended. Wood siding, when used with wood framing may be nailed through the insulating material to the wood studs, but with conventional steel framing, wood nailing strips fastened to the steel framework must be provided to support the siding. With brick or stone veneer, tie clips for supporting the masonry walls are attached directly or indirectly to the wood or metal framework at close intervals.

Insulation in forms other than the rigid or board type obviously possesses even less additional utility than the conventional board type.

It is therefore apparent why insulation is commonly considered an "extra" in the cost of construction since it is conventionally employed primarily for its insulating value with little or no additional utility as a structural member.

With the type of construction provided by the invention, previous concepts of the "practical limit" in the use of insulating materials are completely nullified. By using a solid wall of insulating material of the rigid or board type (preferably with sheets or slabs from 3½ to 4½ inches or more in thickness between the stud members), in combination with the other features of construction provided by the invention, it may be employed as a structural member to a degree heretofore unattainable and the solid sheets or slabs may replace several conventional wall members. Both interior and exterior finishes may be supported by the insulating material and directly applied thereto even with relatively wide spacing (for example 30 to 36 inches, or more) between the wall studs. This, in combination with the methods and means of fabrication and erection provided by the invention, effects a saving in both labor and material which, in most localities, will more than compensate for the additional cost of the greater amount of insulating material used. For example, by utilizing the features of the invention, a steel frame structure, which although not strictly fireproof is fire safe, practically soundproof and possesses insulating properties heretofore considered lavish and uneconomical, but nevertheless highly desirable, can be built at approximately the same or even lower cost than conventional wood frame structures of the type which have previously been considered well insulated but which have much lower insulating properties.

The invention, in its broadest sense, is, of course, not limited to the use of steel framing since many of its features are readily adaptable to other types of framing, including wood frame structures. However, the invention brings steel framing, with all of its readily apparent advantages and the additional advantages which result from the features of the invention, within a cost class from which steel framing has heretofore been precluded. For this reason we will consider, primarily, in our further discussion and explanation of the invention, a steel-frame type of structure.

We are fully aware that many attempts have been made to bring steel framing or steel housing construction into a lower price group. Some of these, by employing pre-fabrication, special materials and special shapes, have succeeded in materially reducing the cost of steel construction. However, all of these, so far as we have been able to determine, employ external walls having an interior or exterior metal surface, or both, and/or in which members of relatively high heat conductivity engage the steel frame and penetrate either the interior or the exterior surface, or both, of any insulation provided in the wall. Such methods obviously disregard or fail to appreciate the importance of avoiding even small areas of high heat conductivity in the external walls. This practice is particularly hazardous in structures employing winter air conditioning since condensation is more than likely to occur at such points and not only weakens the structure in time but often completely destroys the interior finish. This is particularly true with a plastered wall since the plaster itself has a fairly high coefficient of heat transfer and will spread out the cold surface over a much greater area than that of the penetrating member. Condensation on the steel also greatly shortens its life, due to rusting and corrosion. So-called rust-proof finishes are, of course, usually employed but will deteriorate in time and cannot be renewed, due to the inaccessibility of the interior surfaces of the wall. The use of non-rusting metals and rust resistant alloys is, as yet, too expensive for general acceptance and does not avoid the other difficulties mentioned.

The invention provides a steel-frame structure in which there are no members of high heat conductivity penetrating either the interior or the exterior surface of the insulation in the outside walls and in which the steel framework is adequately protected on all sides by insulating material. The steel frame provided in the preferred embodiment of the invention also possesses many unique features, later described, which greatly reduce the cost of designing, fabricating and erecting the same, as compared with conventional practice in steel framing.

In the preferred embodiment of the invention the insulating material, although fastened to and retained in place by the steel framework, is self-supporting and, in addition, supports the interior finish. With stucco or wood siding it may also support the exterior finish. With an exterior finish of brick, stone veneer or the like the masonry supports its own weight but is stiffened and held in place by bonding it to the sheets or slabs of insulating material, and, through the medium of the insulating material, to the steel framework.

As another feature of the invention, in the type of construction hereinafter illustrated and described, the metal stud members, which are housed in solid walls of insulating material, bear a substantial portion or all of the superimposed load of the upper floors and roof of the structure. This avoids the use of more widely spaced and larger auxiliary columns as load-bearing members and thereby greatly simplifies the design and detailing of the structure. It also co-operates with other features of the invention to permit the use of a type of floor, ceiling and roof construction which is highly desirable and advantageous from the standpoint of cost, simplicity of design and construction and durability.

The accompanying diagrammatic drawings illustrate one specific form of structure incorporating the above mentioned and numerous other features of the invention which will be explained in conjunction with the following description of the drawings. Many modifications and alternative details of construction are possible within the scope of the invention. Some of these are also illustrated in the drawings but, since others will be apparent to those skilled in the art from the teachings of the present disclosure, the details of construction must not be construed as limitations to the broader concepts of the invention.

We will first consider, with reference to the drawings, the steel framing and its method of fabrication and erection in the specific form of structure which we have chosen to illustrate and describe the preferred embodiment of the invention.

The framework consists, primarily, of steel members of standard shape which, however, are combined and erected in a novel and advantageous manner.

Although we have chosen welding, and preferably arc-welding, as a means of fabricating the steel framework in the structure illustrated, any other desired means such as conventional riveting or bolting may be employed.

Figures 1, 2, 3:
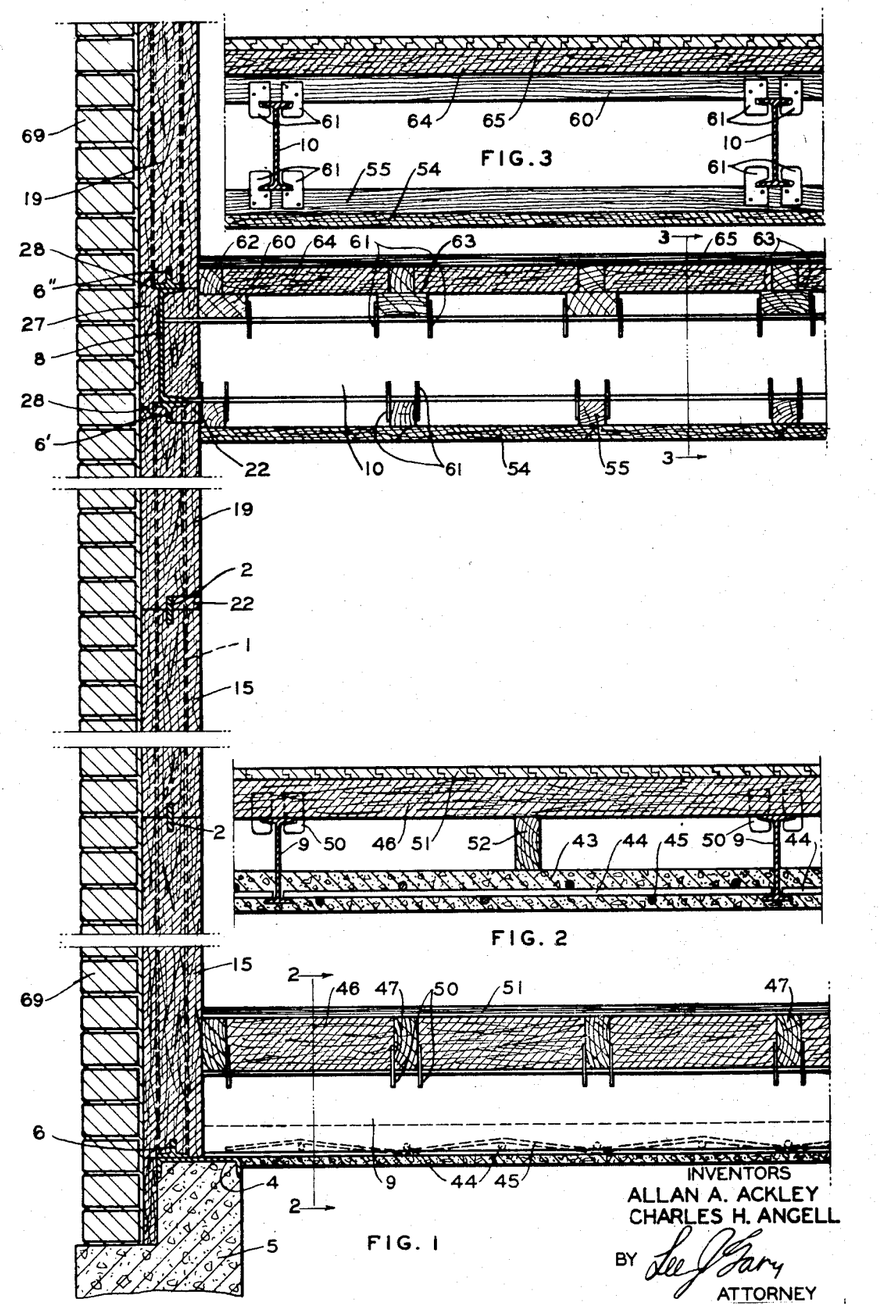
Figure 1 of the drawings illustrates a cross-sectional elevation of a portion of the exterior walls of the building and a portion of the first and second floors.
Figure 2 is a cross-sectional elevation of a portion of the first floor taken along a plane indicated by the line 2—2 in Figure 1.
Figure 3 is a cross-sectional elevation of a portion of the second floor taken along the plane indicated by the line 3—3 in Figure 1.
Figures 4, 5, 6:
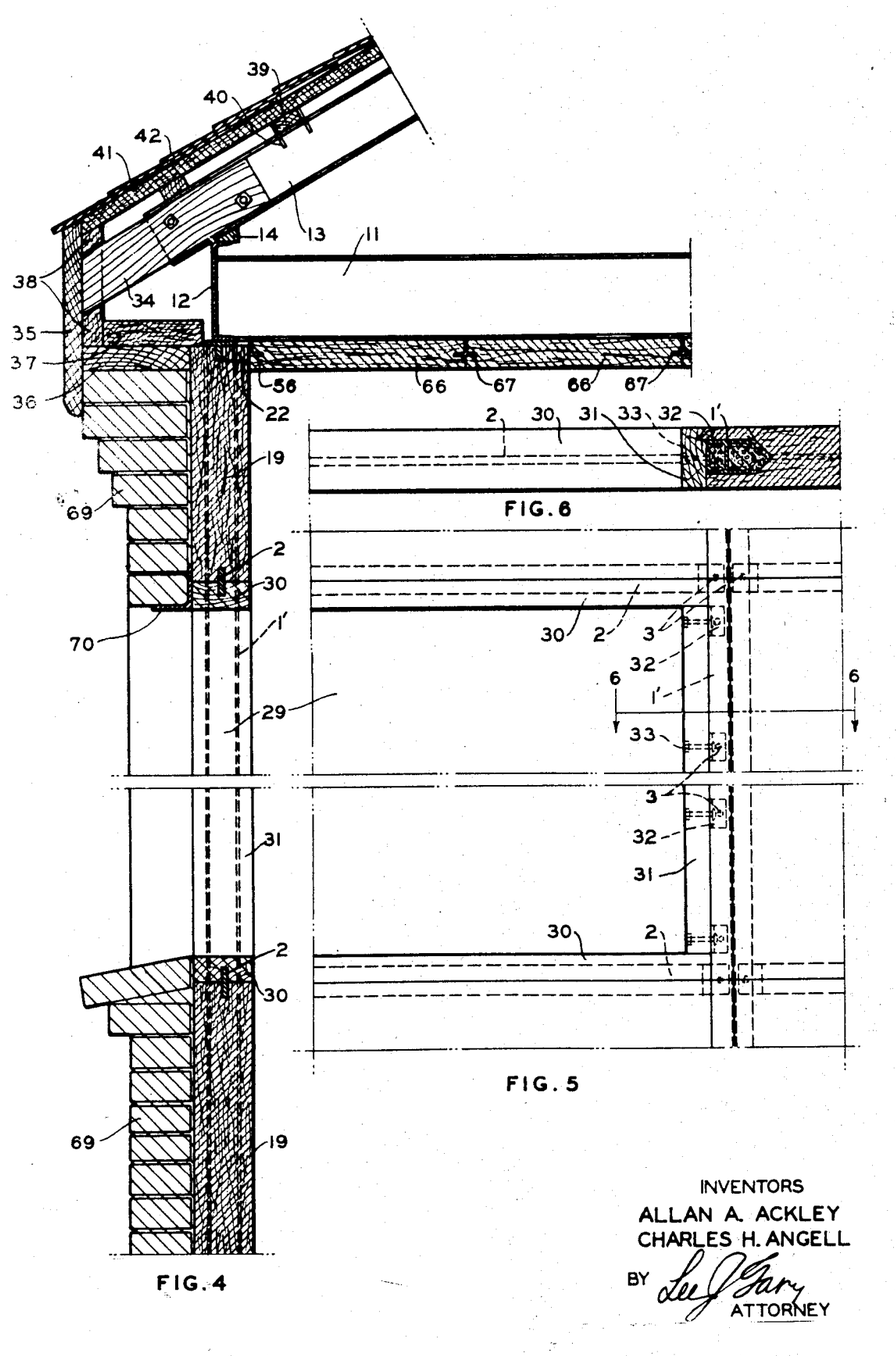
Figure 4 is a cross-sectional elevation of the upper portion of the same wall illustrated in Figure 1 and a portion of the third floor and roof. In this particular view the section is taken through a window opening to indicate one method of framing which may be employed around openings.
Figure 5 is an elevational view of a portion of the same wall shown in Figure 4 looking toward the interior surface of the wall at the window opening.
Figure 6 is a sectional plan view of that portion of the wall shown in elevation in Figure 5, taken along a plane indicated by the line 6—6 in Figure 5.
Figure 10:
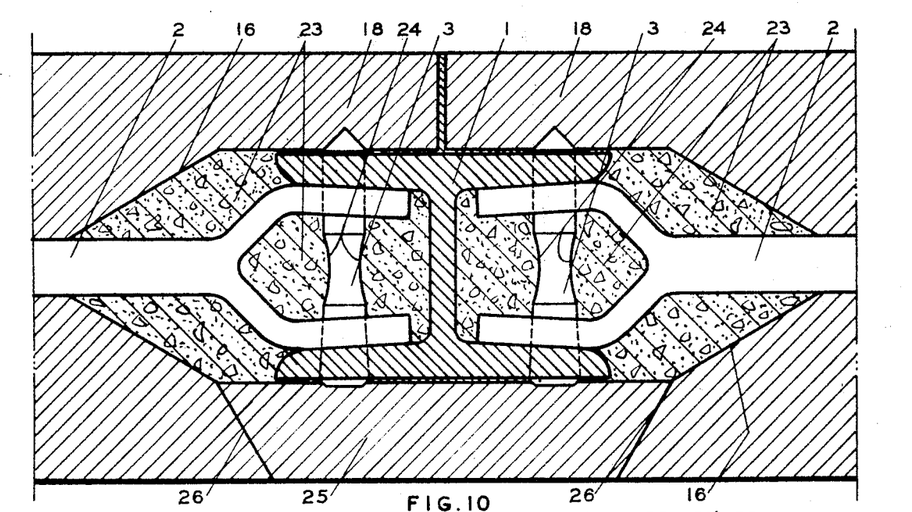
Figure 10 is a sectional plan view of a portion of the exterior wall taken adjacent a vertical column or stud member and showing one specific form of construction at this point in enlarged detail.
Figure 11:
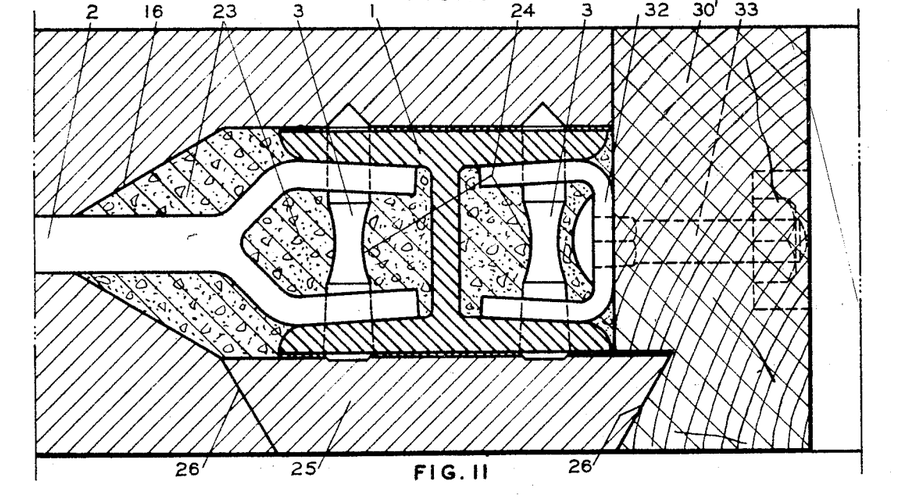
Figure 11 is a sectional plan view of another portion of the exterior wall showing in enlarged detail, one specific form of construction adjacent a framed opening and further illustrates the same method and means of framing around openings as illustrated in Figures 4, 5 and 6.
Figure 12:
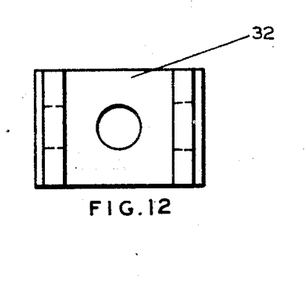
Figure 12 is an elevational view of the member designated as 32 in Figure 11.
Figure 13:
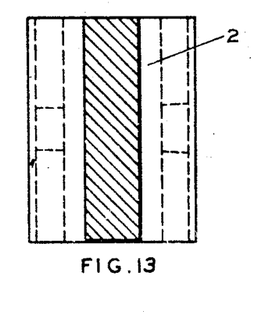
Figure 13 is a cross-sectional view taken along line 13—13 in Figure 10 of the member designated as 2 in Figures 10 and 11.

Referring particularly to Figures 1, 4 and 10, H columns 1, which serve both as studs and as load bearing columns, are assembled in a unique manner which not only braces and positions the studs quickly and aligns the entire wall but also insures their accurate spacing in parallel relation to facilitate subsequent placing of the unit-fabricated slabs of wall material. This bracing, spacing and parallel alignment of the studs is accomplished by means of transverse metal bars 2 having a Y shape at each end which is affixed to the adjacent stud by a pin 3 (see Figure 10). The pins 3 are preferably tapped lightly into position for temporarily aligning the stud members during erection and before the wall slabs 15 and 19 are placed and may be permanently attached to the studs by driving them firmly into place after the adjacent wall slabs are placed. Pins 3 may also be welded or otherwise permanently affixed to studs 1, when desired. These Y bars 2 are placed at vertically spaced intervals between adjacent studs both in the blank walls and around openings, as indicated in Figures 1 and 4.

The studs 1 are assembled upon a base plate 4 which, in the case here illustrated, is a standard channel inverted and placed on the concrete foundation 5, preferably before the latter sets. Ordinarily this base plate is placed in the foundation wall in sections to facilitate pouring of the concrete. The base plates are preferably mitered at the corners of the building and preferably all joints in the base plate are welded. A flat plate or any other desired shape, fastened to the foundation by anchor bolts or in any other well known manner may, of course, be employed in place of the embedded channel, when desired. Anchor bolts or other well known anchoring means, not illustrated, may also be employed with the channel, when desired, instead of or in conjunction with embedding its flanges in the foundation.

A T-member 6 with the web upright and the flanges parallel to the face of the base plate is tack-welded to the latter and, although not necessarily so, is preferably continuous along the entire base plate or, when desired, such a member may form the base plate or a rectangular bar may be welded to the back of the channel to form a T shape. This T-bar serves to align the lower ends of the studs in which a notch is provided to receive the web of the T-bar.

Preferably in the particular form of construction here illustrated, the studs are shop fabricated by cutting them to the required length, notching their webs top and bottom to receive the aligning legs of top and bottom T-bars and drilling or punching the flanges at specified intervals along the length of the studs to receive the locking pins 3 which hold the Y-bars 2. The slots are preferably the same top and bottom and, preferably, the holes are on uniform centers for all blank wall sections and are so placed in the sections containing openings as to position the top and bottom framing of the openings. Specification of the positions of these holes is the only detailing of the steel structure which varies with different structures other than the details, (such as length, size and spacing of the main framing members)

normally required in conventional steel-framing practice. However, it will be apparent that the use of welding in assembling, alignment of the studs in the plane of the wall by the T-bars 6 and the automatic bracing, spacing and parallel aligning of the studs with each other by means of transverse Y-bars 2, greatly reduces the amount of detailing required as compared with conventional steel framing.

Figures 14, 22:
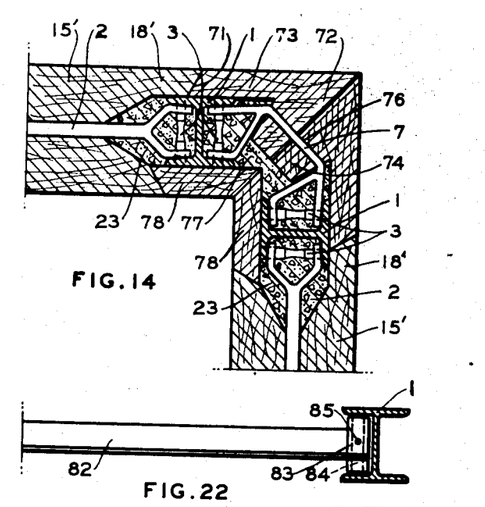
Figure 14 is an enlarged cross-sectional detail of a portion of the external walls of the structure taken at a corner of the building and illustrating one specific form of corner construction.
Figures 21, 22 and 23 illustrate another modification of the bracing, spacing and aligning member.

The studs are erected starting from any desired corner of the structure. A pair of corner studs are placed in position on the bottom T-bar 6 and joined, as indicated in Figure 14, by a special member 7, held in place by pins 3 in the same manner as the Y-bars 2. These corner studs are tack-welded to the base plate and T-bar or may be fastened by temporary bolts or clamps and may, when desired, be guyed by cables or braces, not illustrated. The adjacent studs both in the blank walls and around the openings are progressively secured to the corner studs and to each successive stud member by means of the pinned Y-bars which accurately space them in parallel relation. When the vertical studs for a wall in a single plane are all placed from corner to corner of the structure a T-bar 6', similar to the one on the base plate but inverted, is dropped into place in the slots at the top of the studs and all joints top and bottom are welded.

Thus a minimum of guying and bracing maintains the framing in each wall in approximate position while the wall is being erected and until the entire framework is completed. Adjoining walls are joined and firmly held in their proper relation to each other by the connecting Y-bars and by welding or otherwise fastening the adjoining ends of the top and bottom T-bars and/or the girt members 8 and base plates 4, respectively, in the adjoining walls. A special corner construction, which will be later described, also serves to tie adjacent walls firmly and securely together.

When the first story walls have been erected, as described, girt member 8 which, in this particular case, is a standard channel, is placed atop each wall and welded to the upper T-member 6' in each wall along the edge of the flange and back of the channel. This girt channel not only stiffens the wall but, in the particular case here illustrated, is used as a sill for the second story joists 10 and the upper flange of the channel is used as a plate to which T-member 6", for positioning the second story studs, is fastened. When desired, T-bars 6' and 6" may be replaced by bars welded to the under and upper flange, respectively, of channel 8.

The first and second story joists 9 and 10 respectively, which, in the case here illustrated, are each standard I-beams, may now be placed, as indicated in Figure 1 and as will be later more fully described. Wood joists or expanded or fabricated steel joists, precast concrete joists or the like may, of course, be employed, when desired.

The second story studs are erected in the same manner as that described for erection of the first floor wall studs, being aligned top and bottom in the plane of the wall by slots in their webs which engage T-bars 6" and 6''' and being braced, spaced and aligned in parallel relation by Y-bars 2.

The second floor wall studs 1' are likewise surmounted by a girt channel 12 which, in the case here illustrated, receives the attic floor joists 11 and act as a sill for the roof members, as will be later described in more detail.

T-bars 6" and 6''' may also be replaced, when desired, by bars welded, respectively, to the upper flange of girt member 8 and the lower flange of girt member 12.

The method and means above described for fabricating and erecting the steel framework for the outer walls of the structure offer several advantages which contribute to provide a structure of standardized high quality at low cost. Among these advantages are the following:

(a) The facility with which the entire steel frame may be prepared for rapid and accurate erection by simple shop operations, (such as cutting to length, punching or drilling and slotting of the steel members) greatly reduced field labor without involving excessive detailing and prefabrication.

(b) The shop operations, although relatively few are required and all of which may be easily and accurately accomplished by conventional machine methods, make careless field workmanship practically impossible and greatly facilitate and expedite erection.

(c) Welding of the framework, as provided in the preferred embodiment of the invention and in conjunction with its other features, produces a simple structure of greater sturdiness and rigidity than a conventional riveted or bolted structure and reduces both field labor and detailing by engineers and architects.

(d) The sturdiness and rigidity of the framework, even in its temporary stages, not only obviates the use of extensive bracing and minimizes temporary fastenings during its erection but also, in conjunction with the preferred method (subsequently described) of placing the wall slabs, obviates independent scaffolding and permits finishing operations on upper levels to be done from simple fall-block platforms or even ladders or ladder scaffolds. This greatly reduces both labor and material costs.

(e) Accurate and automatic spacing and aligning of the studs or columns, by means of the T and Y-bars for example, assures an accurate fit for the unit-fabricated sheets or slabs of wall material and further nullifies careless workmanship in the field.

(f) Provision for erecting the entire steel framework before it is necessary to install wall, roof and floor materials is a highly desirable feature. It obviates the necessity of retaining steel workers on the job for a prolonged period or recalling welders or riveters after subsequent stages of the work have been completed. Furthermore, by employing the features of the invention, erection of the framework and placing of the wall, roof and floor materials may progress simultaneously and may be synchronized in such a manner as to greatly expedite the work.

(g) The use of wall studs which also function as load bearing columns, also reduces detailing by engineers and architects and cooperates with the other features of the invention to adapt the structure to any desired architectural type and style. This also contributes to the advantageous feature of eliminating penetrating metal members in the outer walls by permitting the use of smaller members than could be employed in conventional practice wherein larger columns on wider spacing support the superimposed load of floors and roof and wherein intermediate and dependent smaller wall studs (or other retaining members for the wall materials) are employed.

(h) Distribution of the superimposed load of upper floors and the roof on the stud-columns, by means of the girt members in cooperation with other features of the invention, permits placing the floor beams and roof trusses or rafters on any desired centers regardless of the spacing between the stud-columns. This permits variation of the beam spacing in different floor areas to accommodate different loads and permits the use of beam sections of uniform depth throughout each floor, thereby minimizing excess steel and reducing costs accordingly. This feature also makes it possible to eliminate load bearing partitions and, except for unusually long spans, eliminates or, in any case, reduces the required number of interior columns, thereby simplifying, reducing the cost and increasing the flexibility of arrangement of the interior walls and partitions.

(i) Concentric mounting of the girt members on the stud columns, as provided in the preferred embodiment of the invention, although admittedly not new per se, is not a usual feature in steel frame construction for houses but is far superior to eccentric loading. As here used in cooperation with other and novel features of the invention, it permits the use of relatively small stud-columns and thereby permits the use of solid slabs of insulating material of greater thickness than the stud column, the advantages of which will be later described.

(j) The preferred form of structure herein illustrated and above described combines the use of standard structural shapes with a minimum of special members to provide a novel and highly advantageous type of steel framework and each of the special members employed are both simple and inexpensive to construct and each replaces several conventional members. This is in the interest of economy in both labor and material costs and contributes to a fool-proof type of construction.

We will next consider, with reference to Figures 1 to 17 inclusive the preferred form of insulating sheets or slabs used in the exterior walls and the preferred method and means of installing the same and other wall materials. Subsequently, satisfactory floor and roof systems will also be described with reference to Figures 1, 2, 3 and 4.

Any desired type of insulating material which may be formed into relatively rigid thick sheets may be employed for the wall slabs. Such materials include bagasse (cane fiber), corn stalk fibers, wood fibers and numerous other fibrous or granular materials of either vegetable or mineral origin. Gypsous materials and the like, including any material which may be molded or cast may also be employed, although, since the fibrous materials usually possess greater insulating properties and are of lighter weight, they are ordinarily preferred. The invention, insofar as its novel structural features are concerned, is however not limited to the use of slabs or sheets possessing good insulating properties, since these features may, in some cases, be employed to advantage in conjunction with auxiliary insulation applied on either or both sides of the wall slabs and in structures wherein good insulation is not essential.

The usual practice in building up relatively thick sheets of fibrous insulating materials is to laminate relatively thin sheets of the material using a suitable glue or other binder therebetween and slightly compressing the sheets to obtain good contacts between the glued or cemented surfaces. This practice may be followed in fabricating the wall slabs used in the invention or, when desired, the thick slab may be built up in a solid piece without lamination. The latter method is ordinarily preferred in case the material employed is readily adaptable to this method of manufacture and particularly if it is a type which requires an added binder.

Inasmuch as each of the wall slabs employed herein preferably constitute a relatively large unit of the exterior walls and are preferably supplied to the job ready for erection with little or no cutting, trimming, grooving or the like required in the field, we have chosen the term "unit-fabricated" wall slabs to conveniently describe the same. All or a portion of the necessary cutting, grooving, etc. on these slabs may, of course, be performed in the field but, in the interest of accuracy and to replace expensive field labor, insofar as it is practical to do so, with more efficient shop or machine methods, field operations in forming the wall slabs and other insulating members is preferably minimized. They are, however, of such form that fabrication can be accomplished in the field with few or no special tools whenever this is necessary.

Figures 7, 8, 9:
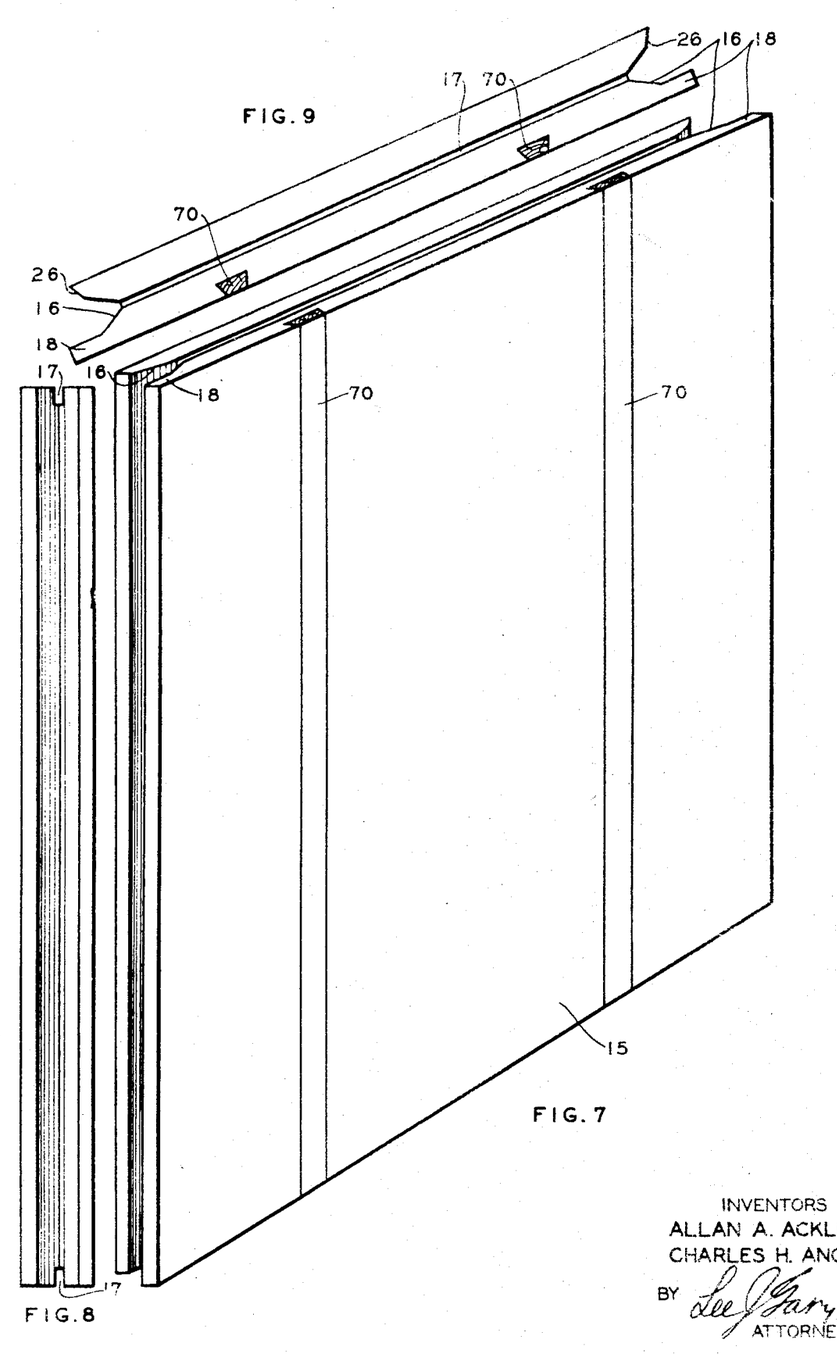
Figure 7 is an enlarged detail, shown in perspective, of the slab or sheet of insulating material designated as 15 in Figure 1.
Figure 8 is an end elevation of the same sheet or slab and Figure 9 is a plan view of the same.

Figures 7, 8 and 9 of the drawings illustrate one specific form of unit-fabricated wall slab such as is designated at 15 in Figures 1 and 4. The profiled vertical edges 16 of the slab and the groove 17 in each of its horizontal edges are preferably machine cut after the thick sheets are formed or either or both of these may be formed as the sheets are built up.

In placing the slabs 15 in the wall (see Figure 1) the first Y-bar 2 between any two adjacent studs may be removed by withdrawing the pins 3 and the first slab is set in place with groove 17 in its lower edge engaging the flange of T-bar 6 which is attached to base plate 4. The flanges 18 along the profiled vertical edges of the slab (see Figures 9 and 10) overlap the flanges of the H-columns 1 so that the inner and outer surfaces of the slab are spaced in proper relation to the columns. The first Y-bar 2 (Figure 1) is then inserted in the groove 17 along the top edge of the slab and pins 3, at opposite ends of the Y-bar, are driven tightly into place from the side of the slab opposite the flanged edges 18, as indicated in Figure 10. The next highest Y-bar is then removed, the succeeding slab registered along groove 17 in its bottom edge with the upper half of the first Y-bar and tipped into position in the wall. The second Y-bar is replaced in the same manner as the first.

Figures 15, 16:
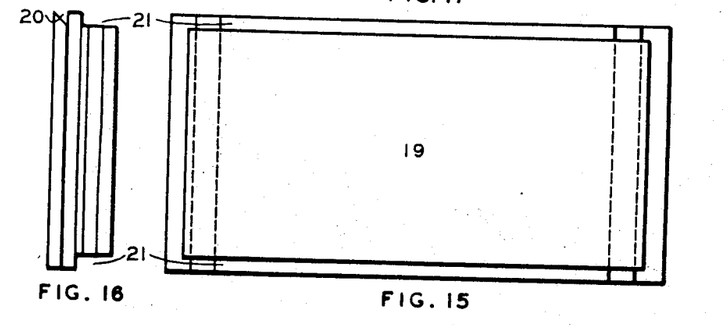
Figures 15, 16 and 17 are, respectively, a side elevation, end elevation and plan view of a slab or sheet of insulating material such as indicated at 19 in Figure 1.
Figure 17:
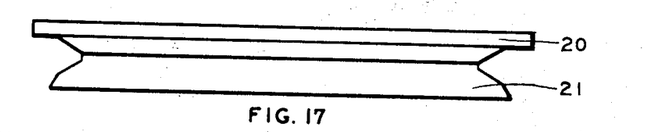

This method is continued until the slabs in the first floor walls of the structure extend to a predetermined point beneath the girt member 8 and at this point a special slab 19, indicated in Figures 1 and 4 and such as illustrated in detail in Figures 15, 16 and 17, is inserted. This slab is similar to slabs 15 except that a wedge-shaped groove 20 (see Figure 16) is cut along one horizontal edge near its outer surface and rectangular grooves 21 are cut along the top and bottom edges on the opposite side of the slab from groove 20. The rectangular grooves 21 permits the slab to be inserted between the studs or H-columns with T-bar 6' along the bottom edge of girt member 8 and the next lower Y-bar in place. Grooves 20 and 21 may be cut either in the shop or in the field, as desired.

The slabs for the entire first floor of the structure are placed between adjacent stud members in the manner described, the only variation from this proceeding being at points in the wall where openings occur and this will be later described with reference to Figures 4, 5 and 6 which indicate a portion of the second story wall having a window opening.

Vertical strips or blocks 25, of insulating material (see Figures 10 and 11), preferably having wedge shaped edges 26 which register with the corresponding wedge shaped portions 16 of the unit-fabricated slabs and with the corresponding wedge shaped grooves in bucks 31 (Figure 11), are slipped vertically into place over the interior surface of the studs, thus completely enclosing the latter in insulating material and leaving no penetrating metal members in the outer walls of the structure except the floor joists which are preferably also enclosed in insulating material, as will be later described.

Since the Y-bars 2 retain the wall slabs in place, it is within the scope of the invention, when desired, to omit the flanged portion 18 of the slabs and employ a member such as 25 on each side of studs 1, although this is not indicated in the drawings.

Rectangular strips or blocks 22, of insulating material, (see Figure 1) are placed in grooves 21 to complete the insulation in the first story walls. However, before strips 22 in the upper groove are inserted a liquid seal and key (such as indicated at 23 in Figure 10) is preferably poured into each of the spaces provided between the profiled edges 16 of the wall slabs and the adjacent stud 1. To pour this liquid seal and key the neck of a funnel or, when desired, a flexible hose communicating with a gun or similar device for handling the material, is inserted in opening 21 at a point adjacent the stud member and a cementitious material such as Portland cement, sand and water (preferably with a fine aggregate such as chat or a small aggregate having insulating properties) is poured or forced into the space adjacent the stud along its entire length. Preferably the material is mixed to a thin consistency to facilitate pouring and to eliminate voids without tamping. When this liquid seal and key sets or hardens it permanently locks the slabs in place and seals the joints against the leakage of air through the wall along the stud members. The liquid seal and key also locks pins 3 in place by virtue of their recessed central portions 24 (see Figure 10), which are preferably provided in case the pins are not welded or otherwise permanently fastened to the studs.

When the first floor wall slabs are in place horizontal strips or blocks of insulating material, indicated at 27 in Figure 1, are set in place over the outer side of girt member 8 and the wall slabs for the second story are then placed. Member 27 preferably has wedge shaped upper and lower edges 28, corresponding to grooves 20 in wall slabs 19, which hold the strips in place. These strips may, of course, be slipped horizontally into place after the upper wall slabs are placed, when desired.

The slabs for the blank sections of the upper story walls are installed in the same manner as that previously described for installing the first story blank-wall slabs, except that a groove 20 is provided in the lower side of the lowermost slabs to receive the grooved upper edges 28 of strips 27.

With reference now to Figures 4, 5 and 6, which illustrate an upper section of the wall having a window opening 29, the lowermost slab 19 extends to just below the rough wood-framing for the window opening and, in the particular case here illustrated, the horizontal bucks 30 at top and bottom of the opening have grooves cut in one face which engage the Y-bars 2 in the adjacent slabs. The vertical bucks, such as indicated at 31 in Figure 5, are inserted and to these suitable U-shaped metal clips 32 are attached by bolts 33 or in any other suitable manner, these clips being, in turn, attached to the adjacent stud members by pins 3 (see Figure 11).

Rough framing for doors may be installed in a similar manner, this method permitting the use of standard wooden door and window frames. Steel window frames may, of course, be employed, when desired, but due to their high heat conductivity are ordinarily not preferred.

Preferably before the rough framing for the opening is installed the upper wall slab above the opening is placed. This is done by registering groove 17 in its upper edge with the leg of T-bar 6''' and then inserting Y-bar 2 in the lower groove 17 and pinning the bar in place. By employing this method groove 21 in the lower edge of this slab is not required and groove 21 in its upper edge need not be continuous but occurs only at the two upper corners adjacent the studs to permit pouring the liquid seal and key. The horizontal bucks 30 are then placed, registering the grooves in their faces with bars 2, and the vertical bucks 31 are tipped and slid into place, the clips 32 (previously attached thereto) being pinned to the studs.

No wedge shaped groove is required in either the upper or lower edge of slabs 19 at the top of the upper story walls and, in fact, this slab may be of the same form as slab 15, when desired, the necessary openings for pouring the liquid seal and key being cut in the field. This slab is designated as 19 rather than 15 in Figure 4 because it will usually correspond in height to slabs 19, slabs 15 usually being larger.

The liquid seal and key 23 is installed in the upper story walls in the same manner as in the lower story walls.

It will, of course, be understood that the liquid seal and key is not absolutely essential since the wall materials are well secured by means of the Y-bars 2 and the flanged portions 18 along the profiled edges of the slabs. However, this member has many advantageous features. In addition to serving as an auxiliary locking means and as a seal it serves to stiffen the stud members and permanently knits the entire outer wall structure into a rigid inflexible unit. It is particularly desirable in structures which are subjected to considerable vibration and in localities where wind velocities are high. It is also particularly desirable in sections which are subject to earthquakes.

A cross-sectional plan view of one specific form of corner construction which may be employed is illustrated in Figure 14. Referring to this figure, the wall slabs or sheets 15' adjacent the corner studs 1 are installed, in the manner previously described, utilizing Y-bars 2 and pins 3 and these slabs 15' are of the same form as wall slabs 15 or 19, depending upon their location in the wall, except that in the particular case here illustrated the flanged portions 18' have edges 71 which are cut on an angle to assist in retaining in place the flanged portions 73 of the corner pieces 72.

The corner pieces 72 are also constructed of insulating material. They have flanged edges 73 which overlap the adjacent corner studs 1 and an extended central portion 74 having a diagonal groove 76 therein to receive the corner bracing and aligning member 7.

Member 7, in the case here illustrated, has Y-shaped end portions similar to those of members 2 and which are likewise attached to the flanges of studs I by means of pins 3.

The corner members 72 are preferably the same height as the adjacent wall slabs so that the holes provided in the opposite flanges of the corner studs occur on the same centers but, of course, when desired, the corner pieces may be of smaller or greater height and the vertical centers between pins 3 which hold members 76 in place may be varied accordingly. The mid-section of the special Y-bar 76 preferably interlocks adjacent superimposed corners members 72 in the same manner as Y-bars 2 interlock adjacent slabs 15, 15' and 19.

Preferably a liquid seal and key, such as previously described and indicated at 23 in Figure 10, as well as by the same number in Figure 14, is utilized between the corner studs and sheets 15' and a similar liquid seal and key 77 is utilized between the corners studs and members 72. This seal is poured after sheets 78 of insulating material are placed over the inner flanges of stud members I and access to the corner space for pouring the liquid or plastic material may be gained by a suitable opening, not illustrated, at the upper end of member 78, which opening may be subsequently plugged, for example, with a mixture of fibrous insulating material and a suitable binder or with a solid piece of insulating material inserted and sealed in the opening.

The type of construction herein provided permits the use of wall slabs of standardized sizes for any style of architecture and any specific form of structure. Ceiling heights in residences are fairly well standardized and the slabs such as 15 for blank wall sections are preferably made in standard heights which will allow two or more such units for any ceiling height and leave a space at the top of the wall for a slab such as indicated at 19 in Figures 1 and 4. The height of slabs 15 may be four feet, for example, and the slabs 19 may be made in heights varying from six inches to three feet or more, preferably in multiples of from two to six inches or some other even dimension. The standard stud spacing may be fixed, for example, at three feet, so that a large portion of the blank-wall slabs will be approximately three feet wide. Narrower widths will ordinarily be stocked, however, to accommodate any odd spaces between openings as well as wherever, due to the size of spacing of openings, etc., adjacent studs occur on closer centers. It it a simple matter to trim, groove and/or profile the required number of odd dimension slabs in the shop when they are ordered to size and, whenever necessary, odd size slabs may be cut in the field.

Preferably, to assist in protecting the metal framing members and to insure positive sealing of all joints in the external walls, the portion of wall slabs and the faces of the strips or blocks and all other insulating members which bear against the metal members, as well as the adjoining edge and end portions of the various insulating members, are coated, before they are installed in the wall, with a sealing material and binder such as emulsified asphalt or any other suitable relatively viscous liquid or plastic material. This material may, when desired, be applied to the metal members instead of or in addition to coating the portions of the strips and slabs which bear against the metal members. The use of this material is, of course, not essential since the joints adjacent the studs are sealed, in the preferred embodiment of the invention, by the liquid seal and key and the bars 2 act as a seal between adjacent wall slabs. However, the material selected for this purpose is preferably one which will retain a considerable degree of elasticity. It may thereby also serve as an expansion joint, permitting expansion and contraction of the entire steel framework without distorting or damaging the walls. Its use is, therefore, ordinarily preferred, at least at points adjacent the steel members.

The use of the unit-fabricated, insulating wall slabs for the exterior walls and their manner of application as herein provided offers many advantages over conventional construction, among which are the following:

(a) The use of thick sheets or slabs of insulating material in the manner provided materially reduces the actual overall heat conductivity of the walls as compared with "well insulated" conventional structures. The wall slabs, in conjunction with other features of the invention, provide solid exterior walls with no air space, thereby eliminating the stack effect (which is all too common in structures having continuous air spaces in the walls) and thereby increases the insulating efficiency of the walls and reduces the fire hazard to a point at which it is practically non-existent. Even fibrous materials which are highly combustible in their normal state are difficult to ignite in the form of thick sheets or slabs and when the sheets or slabs are excluded from contact with air, as herein provided, they are practically fireproof.

(b) The manner provided for fastening the sheets to the framework obviates the use of penetrating members of high heat conductivity in either the interior or exterior surface of the walls, thereby improving the overall insulating value of the walls by keeping the minimum value at any point in the walls near the maximum value at any other point in the walls.

(c) The elimination of penetrating members of high heat conductivity also disposes of the condensation hazard, thereby maintaining the efficiency of the insulation regardless of atmospheric conditions, reducing upkeep expense and increasing the safe life of the structure.

(d) The use of relatively large unit-fabricated slabs or sheets of insulating material as the basic wall material, in conjunction with the simple method and means of erection provided, greatly reduces erection labor costs. The light weight of the material preferably employed for these slabs permits the use of relatively large slabs without making them cumbersome and difficult to handle. A slab of fibrous insulating material four feet by three feet by approximately four inches will weigh only approximately 52 pounds.

(e) The use of solid wall slabs from three and one-half to four and one-half inches or more in thickness, in conjunction with the novel method and means of fastening and stiffening the same, permits their utilization as structural members to a much greater extent than has heretofore been possible with light weight materials of high insulating value. By combining the functions of several conventional materials in one easily erected and inexpensive unit these unit-fabricated slabs accomplish a saving in the overall cost of the wall which entirely removes insulation, as such, from the "extra cost" class and puts a superior type home well within the cost class of the average run of medium priced houses. Conversely, such use of insulating material is adaptable as a means of further reducing the cost and increasing the insulating and operating efficiency of houses in the lower price groups.

(f) Embedding or enclosing the framework of the structure in insulating material, as provided, not only protects the framework but also assists in keeping the overall conductance of the walls close to the minimum at any point therein. It obviates the condensation problem, permitting both summer and winter air conditioning and increasing operating efficiency.

(g) Lateral placing of the slabs between the stud members, as provided by the preferred embodiment of the invention, in preference to forcing them vertically between the studs, greatly simplifies their erection, eliminates hoisting of all the slabs to the top of the structure, permits completion of the framework before it is necessary to start placing the slabs and obviates eccentric loading of the columns by permitting placing of the girt members, which support the floor beams and rafters, concentric with the columns or studs and otherwise assists simplification of the framework and its ease and accuracy of erection.

(h) The unit-fabricated wall slabs combine the use of standard and well known materials with a novel method and means of application. Thus the well established advantages of the materials, as conventionally used, are retained while many of their previous limitations for use as structural members are eliminated. The advantages which accrue from the use of materials of well established characteristics and advantages in a new and advantageous manner will be readily apparent.

(i) The liquid seal and key, provided in the preferred embodiment of the invention has numerous advantages as compared with conventional methods of installing insulation in the walls of a structure. It serves as a locking means for the wall slabs which obviates the use of fastening members which penetrate the surface of the insulating material and greatly reduce its efficiency. It also braces and stiffens the adjoining wall members and knits the entire outer walls of the structure into a sturdy unit of great increased rigidity and strength. By installing it in the form of a liquid or semi-liquid material which hardens or sets after it is placed, its efficiency as a seal is insured. It serves as a protective coating for the metal stud members in addition to bracing and stiffening them. It firmly locks the transverse bracing, stiffening and aligning members in place and, by employing pins of the form illustrated and described, retains the same in place and obviates welding or otherwise permanently attaching the pins to the studs. It may be a relatively cheap material and will not materially increase either the cost of labor or material. It may be installed at any convenient time during erection of the structure before the ceilings are installed and the walls plastered. In short it is a convenient tool which serves a multiplicity of purposes at a very small cost.

(j) The individual features of the wall construction, including the unit-fabricated slabs, the transverse bars, the liquid seal and key, etc., cooperate with each other and with the individual features of the frame construction to produce a finished structure of the highest quality at low cost.

We will next consider, with reference to Figures 1, 2, 3 and 4 of the drawings, one satisfactory system of floor, ceiling and roof construction which is adapted to use and cooperates with the portions of the structure above described.

As indicated in Figures 1 and 2, the first floor joists and basement ceiling beams 9 and the second floor joist and first floor ceiling beams 10 are standard I-beams and preferably these are of uniform depth throughout each floor.

Beams 9 are supported at their ends upon base plate 4 and are preferably welded or may be bolted or riveted thereto. Attachment of base plate 4 to beams 9 is not essential but increases the rigidity of the structure and is preferred. The beams 9 may be supported at intermediate points between the outer walls of the structure, when desired, by columns or load bearing partitions, not illustrated. Such columns or partitions are not particularly objectionable in the basement but in the type of construction herein provided they may be minimized or eliminated, when desired, except in cases where the span between the foundation walls is so wide that the size of the beam required (to prevent excessive deflection when unsupported) is out of proportion to the size required to safely carry the load.

A slab 43 of reinforced concrete is poured, preferably with its under surface extending below the bottom of beams 9 to protect the latter from moisture and fire. Transverse reinforcing members 44 for the concrete slab are, as here shown, supported at their ends on the lower flanges of beams 9 and the longitudinal reinforcing members 45 may be attached in any desired manner, not shown, to the transverse reinforcing bars. When desired, any other type of reinforcement may be employed, including wire mesh or expanded metal welded or otherwise attached to beams 9.

Precast slabs of concrete or any other desired material may, of course, be substituted for the poured concrete basement ceiling or any other desired type of construction may be employed within the scope of the invention.

Relatively thick sheets or slabs of insulating material, indicated at 46, are placed immediately above and transversely to beams 9 and spaced wood members 47, which are attached to the beams by means of suitable clips 50, serve as a nailing base for the wood flooring indicated at 51. This construction obviates the use of conventional sub-flooring and gives a well sealed and well insulated floor. When desired, suitable members of wood, steel, concrete or the like, such as indicated at 52 in Figure 2, may be provided intermediate adjacent floor beams 9 to serve as an auxiliary support for the insulating floor slabs 46.

The second floor joists and first floor ceiling beams 10, which in this case are also standard steel I-beams, are supported at their ends upon the lower flanges of girt members 8. Although not illustrated, intermediate supporting means, such as columns embedded in partition walls or load bearing partitions, may be employed for beams 10, when required. However, load bearing partitions are preferably not used and the use of columns also is preferably avoided or minimized. In many cases no intermediate supports will be required with the type of construction herein provided. Preferably beams 10 are welded or otherwise attached at their ends to girt member 8 along both the webs and flanges of these members, thereby materially stiffening the entire structure at its mid-section.

Sheets of insulating material, indicated at 54 in Figure 1, are provided beneath beams 10 to insulate the latter on their lower side and serve as a ceiling. The ceiling sheets may, of course, be plastered, painted or otherwise finished in any desired manner, but board or sheet type insulating materials may be obtained with a surface suitable for use as a finished wall or ceiling and such use of these materials is entirely within the scope of the invention. The sheets 54 are attached by nailing or in any other desired manner, not illustrated in the drawings, to wood members, such as indicated at 55, which are attached to beams 10 by suitable clips 61 or in any other desired manner. Preferably, since the spacing between beams 10 may vary in different portions of the ceiling, members 55 run transversely to beams 10 so that sheets 54 of uniform width may be employed throughout the ceiling. However, they may run parallel to and be continuous along the under surface of the beams when desired or supporting members for the ceiling sheets extending both transversely and parallel to beams 10 may be employed.

Spaced wooden members 60 are placed on the upper flanges of beams 10 and attached thereto by clips 61. Smaller wood members 62 preferably nailed or otherwise attached to or integral with members 60 are positioned above the latter in such a manner as to provide shoulders 63 upon which insulating slabs 64 are laid. The wood members 62 serve as nailing strips for the finished wood flooring 65.

When desired, transverse supporting members 55 for the ceiling sheets may be supported intermediate beams 10 by attaching them by metal straps, for example, or in any other desired manner, to floor members 60, although such provisions are not shown in the drawings.

Referring now to Figure 4, the upper story ceiling beams 11, which in this case are also standard I-beams, are supported at their ends upon the lower flange of girt channel 12 and preferably are welded or otherwise attached thereto. Intermediate supports will ordinarily not be required for beams 11, since there is little load on this floor, but columns or load-bearing partitions may be employed, when required.

In case an attic floor is desired it may be constructed, for example, in the same manner as the first or second floor. However, in this case, since the attic floor is omitted and no insulating slabs are used over beams 11, the ceiling sheets 66 of insulating material here employed beneath beams 11 are preferably thicker than those employed for the first floor ceiling and a different method of attaching sheets 66 to beams 11 is illustrated. Sheets 66 are supported along their adjoining edges by relatively small metal members such as T-bars 67 and angle 56. Small I or H sections might be employed instead of the T-bars 67 and a small channel section used to replace angle 54, although this is not illustrated. The metal members 54 and 67 are welded or attached in any other suitable manner to beams 11 and, like members 55 in Figure 1, may as here shown, run transversely to the beams. However, the spacing between beams 11 will usually be uniform throughout this floor and, providing the spacing is not too great, members 67 may be parallel and attached to the beams or supporting members for sheets 66 may extend in both directions.

Diagonal cross bracing, although not illustrated, may, of course, be employed between adjacent beams 9, 10 and 11, when the spacing between beams in relation to the depth of their sections requires it. Any well known method of cross bracing may be employed.

One specific roof and cornice construction is also illustrated in Figure 4. Although a pitched roof is here illustrated, a so called "flat" or moderately pitched roof may, of course, be employed when desired and, in either case, the roof trusses or rafters may be either steel or wood.

Steel rafters 13, which may be either standard channels or I-beams, are welded to the upper flange or girt member 12 with a suitable wedge shaped steel member 14 interposed between. Hinged members, not illustrated, which can be adjusted to any roof pitch, may be employed to advantage in some cases instead of members 14, or the rafters may be attached to the girt members in any other well known manner.

Wood strips 39 are attached at spaced intervals to rafters 13 by means of suitable clips 40 and sheets 41 of insulating material are applied over the wood strips. Shingles 42 are nailed through the insulating material to strips 39. These may be wood or composition shingles or, of course, any other desired type and form of roof surface may be used.

Wood members 34 are bolted or otherwise attached to the lower ends of rafters 13 and extend beyond their lower ends to provide a member to which the cornice members 35 may be nailed. A wood member 36 is also provided above the exterior brick veneering 69 for the same purpose. Strips or blocks 37 and 38 of insulating material are also provided to complete insulation of the attic.

In case a flat roof (not illustrated) is employed, any desired roof system, preferably well insulated, may be applied over beams 11. In such cases the wall slabs and studs are preferably carried above girt member 12 in the same manner as they are carried above girt member 8 in Figure 1. A bar, such as Y-bar 2, is preferably employed at the top of the extended walls and is preferably firmly attached to a suitable cap for the walls.

In the particular embodiment of the invention here illustrated brick veneering, indicated at 69 in Figures 1 and 4, is employed for the exterior surface of the walls and, due to the strength of the thick wall slabs and the good bonding surface of the insulating material of which they are preferably constructed, it is ordinarily unnecessary to provide a space between the brick veneering and the wall slabs as is done in conventional practice. Preferably, however, Portland cement is employed in the mortar utilized for the joints both between the bricks and between the interior surface of the brick wall and the slabs of insulating material. The brick veneering is thereby permanently and securely bonded to the wall slabs but is self-supporting. The brickwork above openings may be arched or may be supported, as shown in Figure 4, by means of a metal angle indicated at 70, or in any other suitable manner.

This same type of construction may also be employed for stone veneering or any other masonry surface and it is also possible, with the present invention, to apply stucco directly to the exterior surface of the wall slabs.

For wood siding, nailing strips are preferably provided at relatively close intervals in the walls.

Figures 7 and 9 illustrate one method of inserting wood nailing strips 78 in the wall slabs and preferably in addition to the dovetail construction illustrated the wood strips are glued or cemented in place. The exterior surface of these nailing strips may either be flush with the surface of the slabs or may protrude, as desired and may, of course, be omitted when not required.

When desired, wood strips such as above described but preferably running longitudinally along the wall may be employed with brick or stone veneering, particularly in case the local building code requires the use of clips for tying the masonry veneer to the walls. In such cases, the wood strips serve as a means of attaching conventional clips without allowing the latter to penetrate the insulation.

It is also within the scope of the invention to use furring strips, similar to those indicated at 78, in Figures 7 and 9, except that they protrude from the surface of the slabs, for attaching wood or metal lath to the exterior surface of the wall slabs, when desired. This offers an alternative method of applying stucco to the exterior surface of the walls. Wood nailing strips, flush with the slabs, as indicated in Figures 7 and 9 but on the opposite or interior side of the slabs, are desirable when wood paneling or the like is employed as an interior finish. The wall slabs may, however, be reversed, when desired, so that the flanged portions 18 bear against the interior rather than the exterior faces of the stud members, or flanges 18 may be omitted and strips 26 (Figure 10) employed on both surfaces of the studs.

The wood strips 78, when employed in slabs 15 are, of course, also employed in slabs 19 and other exterior insulating members, although not illustrated.

Although the structure so far described represents what is now considered the preferred embodiment of the invention, many modifications embodying both equivalent and non-equivalent details of construction will be apparent to those skilled in the art from the teachings of the invention. In order to illustrate some of the many modifications which are entirely within the scope of the invention we will refer now to Figures 18 to 34 inclusive.

Figures 18, 19, 21:
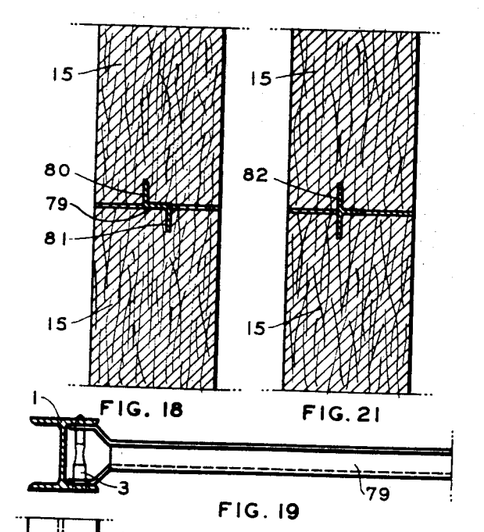
Figures 18, 19 and 20 illustrate a modified form of the bracing, spacing and aligning member designated as 2 in Figures 1, 4, 10, 11 and 13.

Figure 18 is an enlarged cross-sectional view of a portion of two adjacent wall slabs or sheets 15 showing the use of a Z-bar 79 in place of the bracing, stiffening and aligning member 2, previously described.

Figure 19 is a plan view of the same Z-bar 79 which is shown in cross-section in Figure 18 and illustrates one manner of attaching the same to an adjacent column or stud member 1 by means of pin 3.

Figure 20:
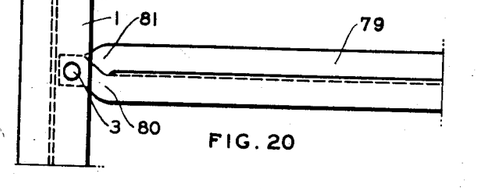

Figure 20 is an elevational view of Figure 19 illustrating how the flanges 80 and 81 of Z-bar 79 may be deformed or bent at the ends of the bar where it is attached to column 1 so as to align the holes in opposite flanges of the column to permit the use of pin 3.

Figure 21 is a cross-sectional view of two adjacent wall slabs or sheets 15 indicating how a T-bar 82 may be utilized to interlock their adjacent edge portions in place of bar 2.

Figure 22 is a plan view of the T-bar 82, indicated in Figure 21, illustrating one manner of attaching the ends of the T-bar to the adjacent column 1. This is accomplished, in the case here illustrated, by a cylindrical member 83 which may be welded or otherwise attached at the end of the T-bar. Member 83 receives a pin 84 which attaches the same and the T-bar to the flanges of column 1 and, when desired, a smaller pin 85 may be inserted through member 83 and pin 4 to lock the latter in place.

Figure 23:
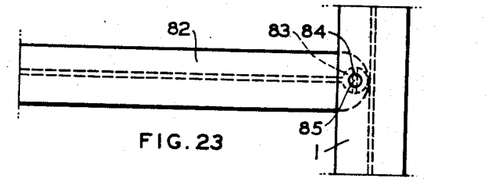

Figure 23 is an elevational view of the T-bar 82 and a portion of the column 1 illustrated in Figure 22.

Members such as Z-bar 79 and T-bar 82 may be utilized to advantage whenever it is desirable or necessary to employ transverse bracing between adjacent studs of greater rigidity than that afforded by the flat section of Y-bars 2. However, they are, of course, somewhat more expensive and will not ordinarily be required.

Figure 24:
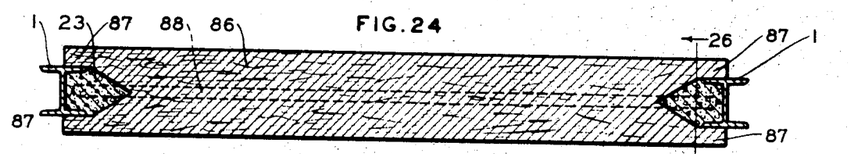
Figure 24 illustrates a sectional plan view of a modified form of wall sheet or slab incorporating longitudinal stiffening and bracing members and also illustrating adjacent stud members and the liquid seal and key which bonds the stud members to the slab and seal the joints therebetween.

Figure 24 is a sectional plan view of a modified form of wall sheet or slab designated as 86. This particular form of slab employs a flanged portion 87 on each side of each vertical edge so that it is necessary either to install the slabs in the wall as the stud members 1 are erected or to omit the girt members 8 and 12 (see Figures 1 and 4) until the slabs have been slipped vertically in place between the stud members. Also, in this particular case, transverse bracing and stiffening bars 88 are embedded in the sheets or slabs and extend through the profiled vertical edges of the sheets, the extended ends of the bars being embedded in the liquid seal and key 23 when the latter is poured.

The bars 88 may be embedded in slabs or sheets 86 when the latter are fabricated or, by fabricating the sheets with longitudinal holes therethrough where the bars are to occur, the latter may be inserted in the field. In the latter case holes (not illustrated) may be provided, when desired, in the webs of stud members 1 so that the bars 86 may be continuous between openings in the wall, the bars, of course, being inserted in such cases after the sheets are in place in the wall. Embedded bars 86 may be of circular cross-section, as here illustrated, or may be of any other desired shape.

Figure 25:
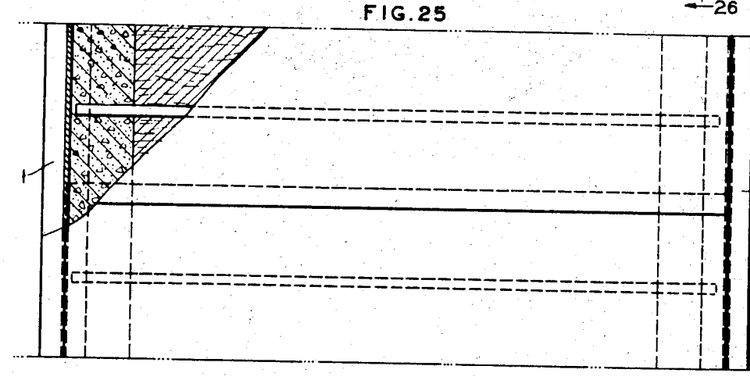
Figure 25 is a vertical plan view, partially in section, of portions of vertically adjoining wall sheets or slabs of the type illustrated in Figure 24.

In Figure 25 the upper and lower portion, respectively, of two adjoining sheets between the same two adjacent stud members are illustrated. Figure 25 may be considered an elevation (taken partially in section) of the sheets, studs and embedded bars illustrated in Figure 24.

Figure 26:
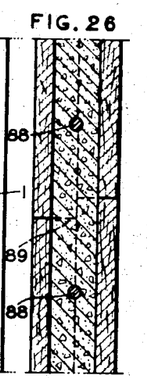
Figure 26 illustrates a vertical section of Figures 24 and 25 taken along a plane indicated by the line 26—26 in Figure 24.

Figure 26 is a vertical cross-section through the wall taken along a plane indicated by the line 26—26 in Figure 24 and illustrates, at 89, one form of horizontal edge construction for the adjoining sheets or slabs. It is, of course, entirely within the scope of the invention to utilize a tongue and groove or any other desired type of joint between the horizontal edges of adjacent sheets instead of the lap joint illustrated in Figure 26, or, when desired, the horizontal edges of the sheets may be flat since a bonding and sealing material such as emulsified asphalt or the like is preferably applied to these edges.

Figure 27:
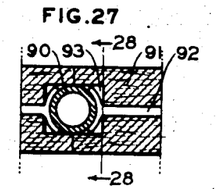
Figures 27 to 36 inclusive illustrate three modified forms of wall construction utilizing vertical stud columns of cylindrical cross-section. Each of these figures will be later described in more detail.
Figures 28, 29, 30, 32, 33, 34:
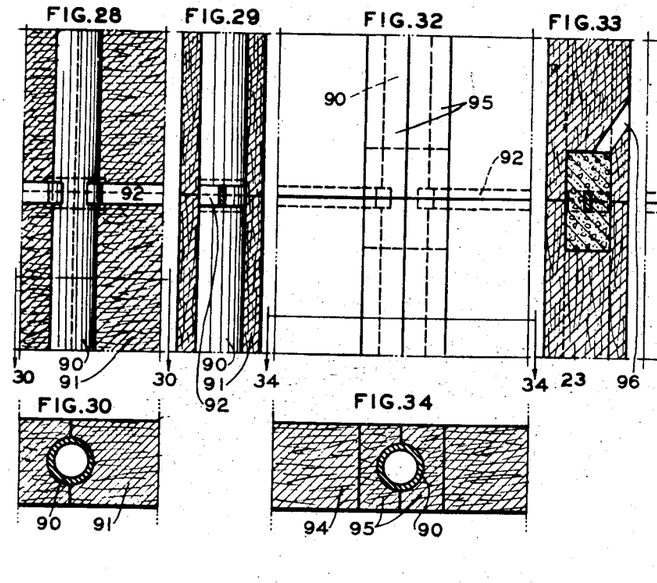

Figures 27, 28, 29 and 30, as previously mentioned, illustrate a modified form of wall construction utilizing cylindrical studs or columns 90, wall sheets or slabs 91 having a rectangular recess in the upper and lower portion of their vertical edges and a modified form of Y-bar, indicated at 92, which (as indicated in Figures 28 and 29) is inserted between the horizontal edges of adjacent sheets in the same manner as Y-bars 2 (previously illustrated and described) but which, in this particular case, is held in place by the contour of column 90 and by friction between the adjacent surfaces of the Y-bar and column. The bars 92 may, of course, be welded to the columns 90, when desired, or attached thereto by any other well known means, not illustrated, such as cap screws, for example.

Figure 27 is a sectional plan view of the wall taken adjacent column 90. Figure 28 is a sectional side elevation of Figure 27 and Figure 29 is a sectional end view of Figure 27 taken along a plane indicated by the line 28—28 in Figure 27. In Figures 27, 28 and 29 a liquid seal and key is not illustrated but this may be employed, when desired, in which case the rectangular recesses 93 in the vertical edges of the sheets are preferably made deeper and may or may not be continuous along the vertical edges of the sheets, as desired. The form of construction illustrated in Figures 27, 28 and 29 (like that illustrated in Figures 24, 25, and 26) necessitates erection of the sheets or slabs along with the columns or vertical placing of the slabs between the columns.

Figure 30 illustrates a section taken along a plane indicated by the line 30—30 in Figure 28 and shows how the wall slabs 91 conform to the contour of column 90, except at points in their vertical edges adjacent bars 92, when the recesses 93 are not continuous along the vertical edges of the slabs.

Figures 31, 32, 33 and 34, as previously mentioned, illustrate another modified form of wall utilizing a cylindrical column 90 and Y-bars 92 similar to those in Figures 27, 28 and 29.

Figure 31:
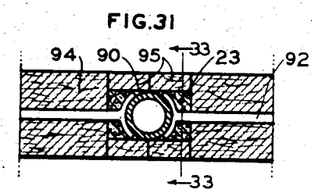

Figure 31 is a sectional plan view of a portion of the wall taken adjacent column 90. Figure 32 is a side elevation of Figure 31 showing corner portions of four adjacent wall slabs. Figure 33 is a sectional elevation taken along a plane indicated by the line 33—33 in Figure 31 and Figure 34 is a cross-sectional view taken along a plane indicated by the line 34—34 in Figure 32.

In the form of construction illustrated in Figures 31 to 34 inclusive, the vertical edge portions of the wall slabs 94 are plain (not profiled or recessed) and an additional strip of insulating material 95 is provided between the edge of each slab or sheet 94 and the adjacent stud 90. These strips 95 conform on their inner edges to the contour of column 90 and the ends of the strips are recessed, as indicated in Figures 31 and 32, to provide space for the ends of Y-bars 92 and for the liquid seal and key 23. The latter may be poured, for example, through openings drilled through the strips adjacent the upper end of the recess and later plugged. Such an opening, before plugging, is indicated at 96 in Figure 33. The liquid seal and key may, of course, be omitted, when desired, in which case the recesses in strips 95 need only be of sufficient size to receive the ends of Y-bars 92.

Slabs 94 may be placed horizontally between the studs, Y-bars 92 being removed and replaced as required and strips 95 having previously been placed adjacent the columns.

Figure 35:
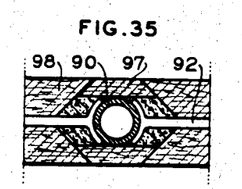
Figure 36:
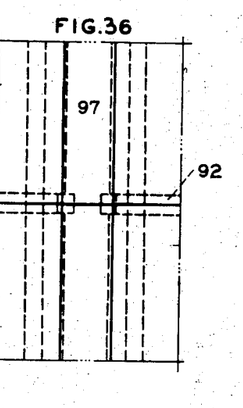

Figures 35 and 36 are, respectively, a sectional plan view and an elevation of a portion of another specific form of wall utilizing a cylindrical column 90 and Y-bars 92. In this particular case the vertical edges of the sheets adjacent column 90 are grooved in the form of a V and the outer edge of this V groove retain strips 97 of insulating material which are slipped vertically in place over the studs after the sheets or wall slabs 98 are placed horizontally between the studs and locked in place by Y-bars 92. A liquid seal and key 23 is preferably provided in this form of construction.

Although not illustrated in the drawings, practically any conventional type of interior walls or partitions is readily adaptable to use with the novel exterior wall, floor and ceiling construction herein provided. Wood studding attached to wood plates, top and bottom, with the plates attached to the floor and ceiling beams by metal clips (such as indicated at 61 in Figures 1, 2, 3 and 4, for example), or in any other desired manner, may be employed or metal stud members may be attached directly to the beams or to metal plates attached to the beams. Hollow-tile walls and similar types of construction are also readily adaptable.

Wood or metal lath and a plaster finish may be utilized or, preferably, insulating material may be employed as a plaster base or as a finish. Wood or metal panels, (preferably ply-wood) may be employed when desired. The sheets or rolls of wood veneer (paper thin) now available, preferably applied over insulating material, make an excellent substitute for wood paneling and are readily utilizable for either the interior surface of the external walls or for partitions, or both, in the structure herein provided.

Several special and novel types of partition walls as well as special forms and adaptions of conventional types of partition construction are particularly advantageous for use in combination with other features of the invention. Although they are not here illustrated, the general type and several specific forms of partitions which are preferred for use in cooperative combination with other features of the invention will be briefly described.

Preferably, as previously mentioned, partitions are employed which are non-load-bearing in the sense that they do not carry superimposed floor, ceiling or roof loads. They do, however, carry their own weight, including that of the wall finish. Slabs of insulating material of the rigid or sheet type are preferably employed. These slabs are preferably the full thickness of the partition (exclusive of the wall finish, when separate finishing members are utilized) and are ordinarily approximately three to four inches thick. They may be made in any desired width which can be readily handled and are preferably of substantially ceiling height.

Metal or wood stud members may be employed between adjacent slabs or embedded therein, when desired, but in many cases no studs will be required (particularly if the partitions are plastered or veneered with ply-wood or have some other finish which serves as a compression membrane on one or both sides).

The partition slabs may be retained in place by either wood or metal members running lengthwise of the partition, top and bottom, which engages the top and bottom edges of the slabs. The retaining members may be attached to the floor and ceiling beams, either directly or indirectly, and may be either beneath or, preferably, exterior to the finished surface of the floor and ceiling. They may engage grooves or slots provided in the top and bottom edges of the sheets or may form a channel or like member with flanges bearing against the exterior surfaces or recesses in the exterior surfaces of the slabs along their top and bottom edges. When stud members are employed they preferably engage the retaining members, top and bottom.

This type of partition construction provides a sound-proof wall which is inexpensive and easy to erect, thereby reducing labor costs, and which may employ any desired type of finish. The solid slabs of wall material will support plaster or paneling of any type. Paper, paint, wood veneering or the like may be applied directly to the slabs or the slabs themselves may have a surface suitable as the wall finish. Board type insulating materials (usually compressed to greater density than when the material is used primarily as insulation) may be incorporated with the partition slabs as well as with the slabs used in the exterior walls, when desired, being either laminated with the slabs or applied in any other desired manner in the shop or on the job and, in the latter case, either before or after the wall slabs are erected.

Another advantageous feature of partitions of this type resides in the fact that (due to their simplicity, ease of erection and removal and non-load-bearing characteristics) the interior arrangement of the structure may be changed with a minimum of expense and waste materials. Few home owners who have not had considerable experience in building are able to visualize or to anticipate the exact form of interior arrangement which will best suit their particular needs. On the other hand, their requirements and ideas may change from time to time. But with the type of interior wall construction herein provided this important problem is greatly simplified. The partitions and/or portions thereof may literally be moved about like stage scenery with comparatively little expense and inconvenience.

When load-bearing interior walls are required or desirable they may be constructed in the same or a similar manner as the exterior walls, the liquid seal and key being usually omitted, or load-bearing columns may be embedded in non-load-bearing partition slabs or interposed between adjacent slabs.

It will, of course, be apparent that the features provided in the various modified forms of the invention illustrated and above described may be combined in manners other than those indicated and such combinations are entirely within the scope of the invention.

We claim as our invention:

1. A wall section comprising, in combination, spaced stud members, a slab of insulating material thicker than the studs and disposed therebetween, said slab having edges complementary to adjacent edges of the studs, and means for attaching the slab to the studs comprising auxiliary members which are embedded in said edges of the slab and are engaged with said complementary edges of the studs.

2. A wall comprising, in combination, spaced stud members, slabs of insulating material thicker than the studs and disposed therebetween, auxiliary members which extend between adjacent studs, means for embedding said auxiliary members in the slabs and means for engaging said auxiliary members with the studs, whereby to attach the slabs to the studs.

3. A wall comprising, in combination, spaced stud members, slabs of insulating material thicker than the studs and extending therebetween, auxiliary members disposed between vertical edges of the slabs and adjacent vertical edges of the studs, means for embedding said auxiliary members in said vertical edges of the slabs and means for engaging said auxiliary members with the studs, whereby to retain the slabs in place in the wall.

4. A wall section comprising, in combination, spaced stud members, a slab of insulating material thicker than the studs and disposed therebetween, said slab having opposite faces which extend beyond the adjacent faces of the studs, and means for attaching a central portion of the slab to the studs, said central portion being disposed between and substantially beneath said opposite faces of the slab.

5. A method of wall construction comprising the steps of erecting spaced wall studs, placing a slab of insulating material laterally between the studs from a side of the wall with vertical edges of the slab adjacent vertical edges of the studs and attaching the slab to the studs by placing auxiliary members between said adjacent vertical edges of the slab and studs.

6. A method of wall construction comprising the steps of placing a slab of insulating material laterally between spaced stud members from a side of the wall and attaching the slab to the studs by embedding an auxiliary member in a horizontal edge of the slab and engaging the auxiliary member with the studs.

7. A method of retaining a slab of wall material in place between spaced stud members in a wall which comprises placing auxiliary members, comprising material in fluid or plastic state, in interlocked relation between vertical edges of the slab and adjacent vertical edges of the studs and causing said fluid or plastic material to harden or set.

8. A building wall comprising, in combination, a pair of spaced stud members, insulation, comprising a plurality of relatively rigid sheets disposed substantially entirely between said studs, and means, including a plurality of auxiliary members each engaging a stud in said wall, for retaining said sheets in place in the wall, said auxiliary members extending only part way into said sheets from the edges of the latter which lie adjacent and substantially parallel to said studs.

9. A wall structure such as defined in claim 8 wherein said studs and auxiliary members are covered, on opposite sides of the wall, by a substantial thickness of said insulation.

10. A building wall comprising, in combination, a plurality of pairs of spaced studs disposed in a common vertical plane, auxiliary members extending transversely between said studs and attached thereto, slabs of insulation disposed between adjacent studs, with edge portions of said slabs adjacent and substantially parallel to said studs and other edge portions thereof adjacent and substantially parallel to said auxiliary members, and means for embedding said auxiliary members in said adjacent edge portions of the slabs, whereby to attach the slabs to the studs.

11. A wall structure such as defined in claim 10, wherein said studs and auxiliary members are covered, on opposite sides of the wall, by a substantial thickness of insulation.

12. A wall comprising, in combination, spaced studs, slabs of insulation disposed between adjacent studs, said slabs being provided with recesses extending into the same from edge portions thereof, auxiliary members extending lengthwise of and engaging said studs, other auxiliary members extending transversely to and engaging said studs, each of said auxiliary members extending into at least one of said recesses, whereby to retain the slabs in place in the wall.

13. A wall unit comprising, in combination, a thick and relatively rigid sheet of low-density wall material, such as insulation, a relatively rigid thinner sheet of wall-finishing material of greater density secured directly to one face of said low-density material, at least one auxiliary member of greater density than said low-density material attached to the latter adjacent the opposite face of said unit, said auxiliary member being adapted to serve as a means of attaching wall-finishing material to said unit adjacent said opposite face thereof.

14. In a metal framework for the outer walls of a building, base plates mounted on a foundation and attached thereto, spaced studs mounted on said base plate, stringers surmounting said studs, relatively slender members attached to said base plates and extending lengthwise thereof, relatively slender members attached to said stringers and extending lengthwise thereof, said relatively slender members registering with slots provided adjacent the upper and lower ends of said studs for aligning the latter in the vertical planes of their respective walls, transverse members extending between and attached to adjacent studs for bracing and spacing said studs in substantially parallel relation, means for securing said studs to said base plates and stringers, means for removing said transverse members from the assembled framework and means for attaching adjoining walls of the structure to each other.

15. A method of wall construction comprising the steps of erecting wall studs, spacing adjacent studs and aligning them in substantially parallel relation during their erection by installing transverse members therebetween, removably attaching said transverse members to the studs, subsequently removing the transverse members to permit installing slabs of wall material between the studs, installing the slabs, engaging the transverse members with the slabs and re-attaching them to the studs.

16. A method of wall construction comprising the steps of spacing and aligning adjacent wall studs in substantially parallel relation by installing transverse auxiliary members therebetween, detachably securing said auxiliary members to the studs, aligning the studs in the plane of the wall and, after said auxiliary members are installed, rigidly securing the studs to other main framing members of the structure, whereby to retain the studs in place without the aid of said auxiliary members, thereafter detaching said auxiliary members from the studs, installing wall material between adjacent studs from which said auxiliary members have been detached, interlocking the auxiliary members with said wall material and re-attaching them to the studs.

17. A framed structure comprising, in combination, spaced main framing members, slabs of wall material disposed between adjacent main framing members, means retaining said slabs in place comprising auxiliary members at least partially embedded in recesses extending longitudinally along edge portions of the slabs, and means rigidly engaging the auxiliary members with said main framing members, said main framing members and auxiliary members being disposed between the planes of opposite faces of the wall defined by said slabs.

18. A wall comprising, in combination, spaced main framing members, slabs of wall material disposed between said main framing members and means retaining said slabs in place in the wall, said means comprising auxiliary members which extend lengthwise of said main framing members, engage the same and extend into recesses provided in the slabs.

19. A wall comprising, in combination, spaced studs, slabs of wall material disposed between adjacent studs and means retaining said slabs in place in the wall, said means comprising auxiliary members which extend between adjacent studs and engage the slabs, and means rigidly engaging the auxiliary members with the studs, the last named means comprising other auxiliary members which extend lengthwise of the studs.

20. A wall comprising, in combination, a pair of spaced studs, a substantially rigid wall sheet having a relatively thick central portion and relatively thin vertical edge portions, said central portion being disposed between the studs and said vertical edge portions overlying adjacent faces of the studs, and auxiliary members which are engaged with said relatively thick central portion of the sheet and with the studs to assist in retaining the sheet in place in the wall.

21. A wall comprising, in combination, spaced main framing members having faces substantially parallel to the plane of the wall which are wider than the central portion between said faces, wall slabs disposed between said main framing members and means retaining said slabs in place in the wall, said means comprising auxiliary members which are retained between said relatively wide faces of the main framing members and engage portions of the slabs which are provided with recesses for the reception of said auxiliary members.

22. A building framework comprising, in combination, a base plate, spaced studs mounted on the base plate and attached thereto, a girt member mounted on the studs and attached thereto, auxiliary members extending between adjacent studs for spacing and aligning the same in substantially parallel relation and means, comprising removable pins, for releasably attaching said auxiliary members to the studs.

23. A building framework comprising, at an intermediate stage in its construction, the combination of a base plate, spaced studs mounted on the base plate, a girt member mounted on the studs, means, loosely engaging opposite ends of the studs with the girt and the base plate, which serve to align the studs in the plane of the wall and permit sidewise movement of the studs along the girt and base plate, and auxiliary members extending transversely between adjacent studs and attached thereto at points intermediate the girt and base plate for spacing and aligning the studs in substantially parallel relation.

24. A structure such as defined in claim 23 wherein said auxiliary members are attached to the studs by means, comprising removable pins, which permit the removal of said auxiliary members from the assembly.

ALLAN A. ACKLEY.
CHARLES H. ANGELL.